Patented Jan. 20, 1953

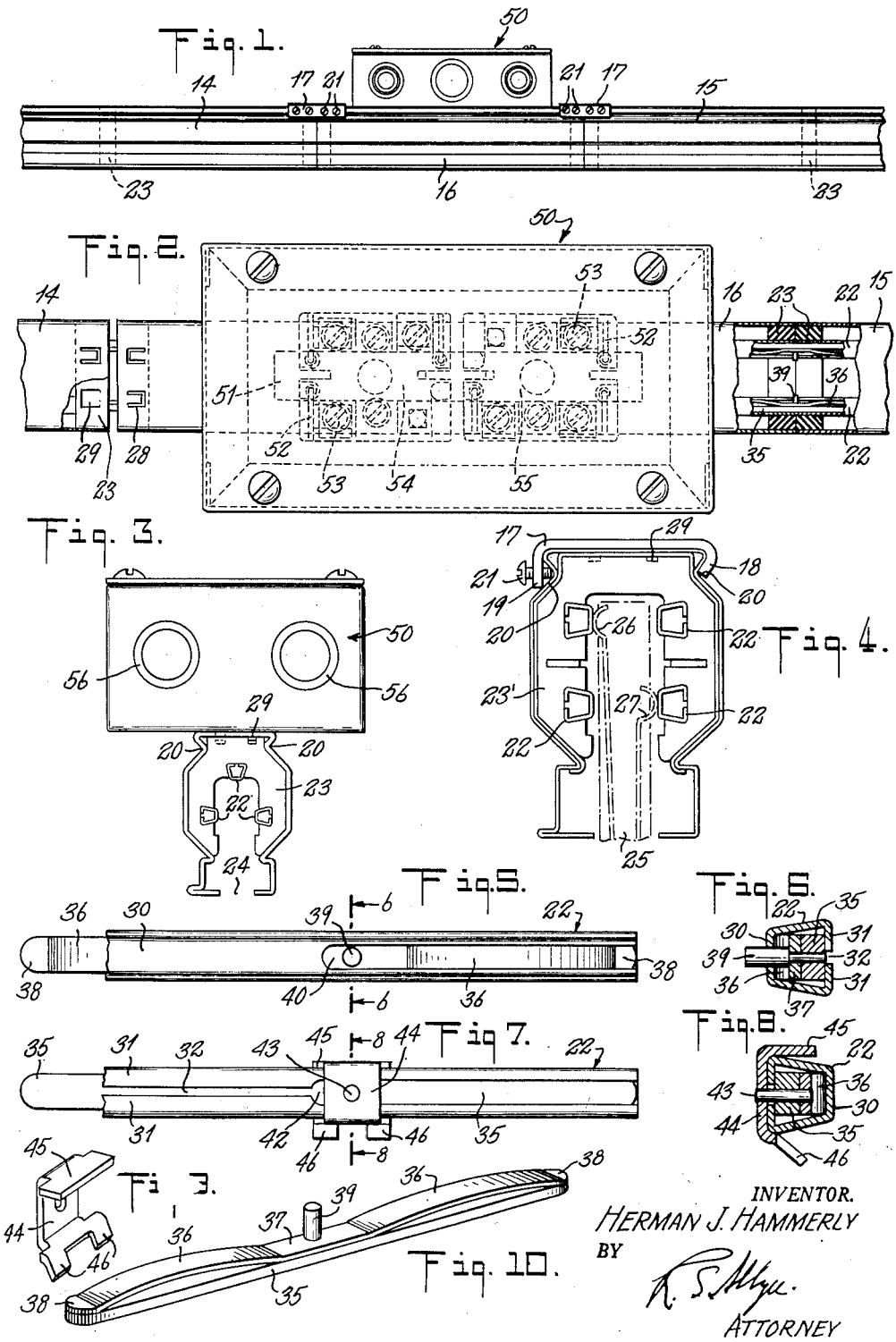

2,626,298

UNITED STATES PATENT OFFICE 2,626,298

SLIDING CONNECTOR FOR BUS BAR SECTIONS

Herman J. Hammerly, Plainville, Conn., assignor, by mesne assignments, to General Electric Company, a corporation of New York Original application January 29, 1949, Serial No. 73,570. Divided and this application April 7, 1949, Serial No. 85,996

3 Claims. (Cl. 173—324)

1

A system such as shown in my application Serial Number 73,570 filed January 29, 1949, employs a duct having a slot extending along one face. The duct is made up of sections which are arranged end to end and has tubular bus bars which are installed in the duct in sections which are connected end to end and supported at intervals along the duct by insulators in such a manner as to provide for the insertion into the duct of take-off collector plugs or trolleys. There may be any number of bus bars constituting the conductors of the system.

Such a system may be of any length and is frequently installed along side walls or ceilings and around corners and has test boxes, feed-in boxes and distribution boxes inserted or attached at intervals. Sometimes it becomes necessary to remove a section of the duct with its bus bars and any parts that may be in or connected to the section.

In order to avoid the necessity of taking down the line from one end till the section to be removed is reached, I provide a special connector or jack for connecting the adjacent ends of successive sections. This jack may be entirely retracted into one of the connected ends. These jacks in large measure serve to unite not only the bus bars but to support the duct sections although other means may be provided to connect the duct sections.

Fig. 1 is a side view on a small scale of a duct system embodying my invention in which a feed-in box unit is attached to the removable section of the duct.

Fig. 2 is a front view of such a removable unit on a larger scale with fragments of the ends of connected duct sections.

Fig. 3 is an end view of a duct section with three bus bars and showing a feed-in or junction box attached.

Fig. 4 is an end view of a duct section with four bus bars and a clamp for connecting two duct sections.

Fig. 5 is a front or face view of a fragment of the end of a bus bar with a retractable jack and embodying my invention.

Fig. 6 is a sectional view taken on the plane of the line 6—6 of Fig. 5 but on a larger scale.

Fig. 7 is a rear view of a fragment of the end of a bus bar showing a modification of the invention.

Fig. 8 is a sectional view taken on the plane of the line 8—8 of Fig. 7 but on a larger scale.

Fig. 9 is a perspective view of the slide of Figs. 7 and 8.

2

Fig. 10 is a perspective view of the jack of Figs. 5 and 6 with one form of handle for retracting the jack.

Such a system includes duct sections 14 and 15 with a readily removable section 16 interposed. Adjacent sections of duct are mechanically connected by plates such as 17 which have flanges 18 and 19. The duct sections in the form shown have grooves 20, 20 along the upper edges. The flange 18 of the plate hooks into the groove along one edge of adjacent sections and a number of set screws 21, 21 carried by the opposite flange 19 are set into the grooves along the opposite edges.

The tubular bus bars 22, 22 are formed of suitable conductive material preferably of a trapezoidal section supported by insulators 23 placed at intervals along the duct. Entrance to the duct for access to the bus bars is obtained through an entrance slot 24.

In the form shown in Fig. 3, there are three bus bars adapted to receive through the slot 24 suitable plug-in or trolley take-off devices for branch circuit connections.

The form of Fig. 4 has four bus bars supported in insulators 23' and adapted to receive a plug 25 with suitable contacts such as 26 and 27.

The bus bars are supported by insulators at each end of a section and usually at intervals of twelve inches. Each end insulator is held in place by lugs 28, 28 cut from the metal of the duct and bent into a recess 29 in the insulator so as to prevent longitudinal movement of the insulator.

Each bus bar has a contact surface 30 and is bent from sheet metal leaving flanges 31, 31 at the rear face with a slot 32 between, as a result of which the bus bar is somewhat resilient so as to fit snugly in the insulators.

The connector or jack is formed of two strips of metal, a rigid bar 35 and a spring member with bowed portions 36, 36 connected to the bar at 37. The tips 38, 38 of the spring member rest and slide on the ends of the bar 35 when the jack is inserted into a bus bar.

Figs. 5 and 7 show the ends of bus bars with jacks in place and retracted.

Figs. 5 and 6 show a projection which may be used as a handle to retract and protrude a jack where it is not important to use a movable trolley collector in the duct. For this purpose the jack has a projection 39 connected to the center of the jack at the contact side. To accommodate such a projection the face 30 of the duct near the end is provided with a slot 40 wide enough to allow for the handle 39 which can be reached through the entrance slot 24 in the duct.

The parts 35 and 36 are preferably pivoted together at 39 so as to permit the spring member 6 to be turned on the bar and thus facilitate adjustment of the spring arms.

Figs. 7 and 8 show a form of handle member used when the contact face of the duct must be left clear for the use of a trolley collector. Here the back of the bus bar is provided with a slot 42 to allow for the rivet 43 which holds the plate 44 against the back of the bus bar. This plate has a flange 45 which extends over one edge of the bus bar and lugs 46 which extend over the opposite edge of the bus bar.

While I have shown and described the invention as applied to any removable section of bus duct, it is particularly valuable where the removable section is a part of or carried by a receptacle such as a box 50 which contains devices for wire conductor cables or test equipment.

Here the duct is provided with an opening 51 which permits the passage of wire connectors 52, 52 from the bus bars within the duct to terminals 53, 53 carried by insulating terminal blocks such as 54, 54 which are mounted in the box 50. The box will have suitable means of access such as through knock-out holes 56 for branch circuit wires to the terminals inside the box.

For laboratory work it is especially desirable to provide a standard length of removable section at intervals along the length of the duct so that various units can be inserted or removed as occasion may direct. Such an arrangement also makes it possible at any time to take down any part of a system by first removing one of the adjacent removable sections without the necessity of starting at one end of the system.

This application is a division of my application Serial Number 73,570 filed January 29, 1949.

I claim:

1. In an electric distribution apparatus, a plurality of tubular bus bars slotted at their ends and disposed in end to end relation with their adjacent slots in alignment, and a connecting jack disposed within adjacent ends of each pair of said bus bars, each said jack comprising an elongated flat rigid bar, a doubly bowed elongated spring member disposed in flatwise engagement with one side of said rigid bar, said spring member having a flat central portion engaging the center of said bar and having similarly arcuately bowed side arms extending oppositely from said central portion and engaging at their ends the ends of said rigid bar, and an upright pin pivotally connecting said rigid bar and said spring member together at said central portion and extending through said aligned slots to permit actuation of said jack to positions of full retraction within either of the associated bus bars.

2. In an electric distribution apparatus including tubular bus bars in end to end relation, a retractable bus bar jack comprising a straight bar, a spring member having its central portion in engagement with one face of the center of said bar and its ends engaging the ends of said bar and a handle member consisting of a plate secured by a rivet to said bar and having offset lugs for embracing the edges of the bus bar.

3. In an electric distribution apparatus including tubular bus bars in end to end relation, a retractable bus bar jack comprising a straight bar, a spring member having its central portion in engagement with one side of the center of said bar and its ends engaging the ends of said bar and a handle member connecting said spring member to said straight bar and including a plate secured to the opposite side of said bar and having offset lugs for embracing the edges of the bus bar.

HERMAN J. HAMMERLY.

REFERENCES CITED

The following references are of record in the file of this patent:

UNITED STATES PATENTS

| Number | Name | Date |
| --- | --- | --- |
| 334,545 | Robinson | Jan. 19, 1886 |
| 1,988,627 | MacLellan | Jan. 22, 1935 |
| 2,098,569 | Curtis | Nov. 9, 1937 |
| 2,239,652 | Morten | Apr. 22, 1941 |
| 2,267,207 | Martin | Dec. 23, 1941 |
| 2,304,924 | Jackson | Dec. 15, 1942 |
| 2,412,382 | Anderson | Dec. 10, 1946 |
| 2,441,698 | Gerspacher | May 18, 1948 |

FOREIGN PATENTS

| Number | Country | Date |
| --- | --- | --- |
| 715,899 | France | Dec. 10, 1931 |
| 840,456 | France | Apr. 26, 1939 |